Sept. 19, 1967  C. M. WESTBROOK  3,342,065
TORQUE METER WITH BALANCING ARRANGEMENT
Filed Nov. 18, 1964  2 Sheets-Sheet 2
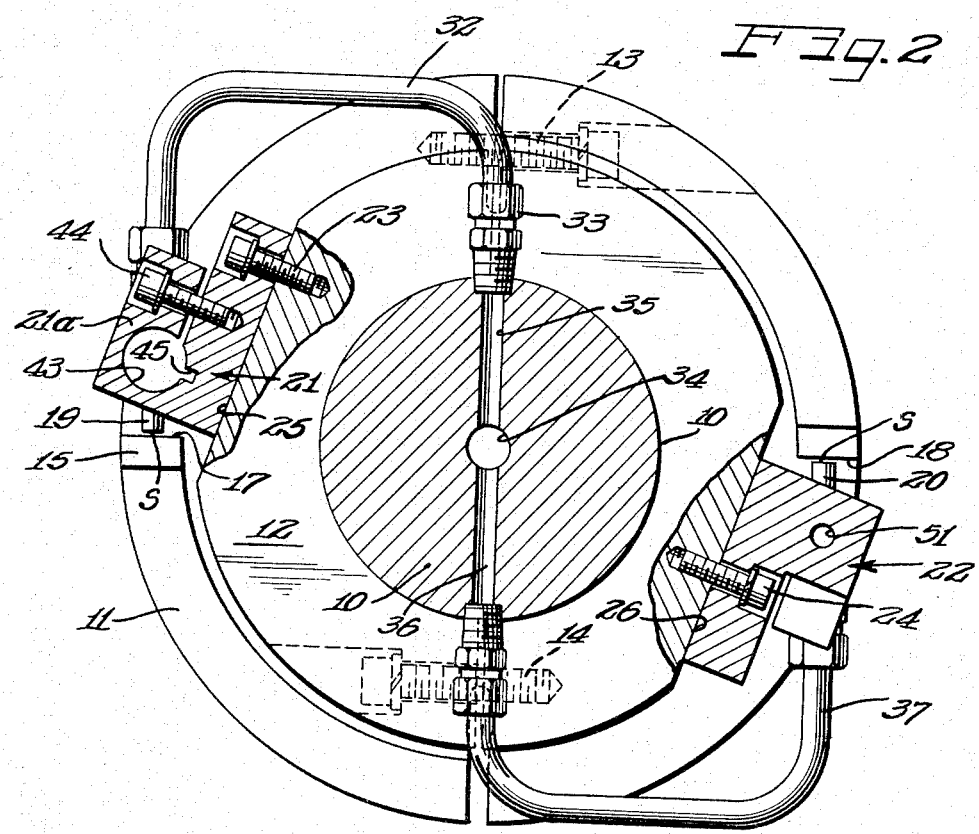
INVENTOR.
Carl M. Westbrook
BY Hill, Sherman, Meroni, Gross & Simpson
ATTORNEYS United States Patent Office 3,342,065
Patented Sept. 19, 1967

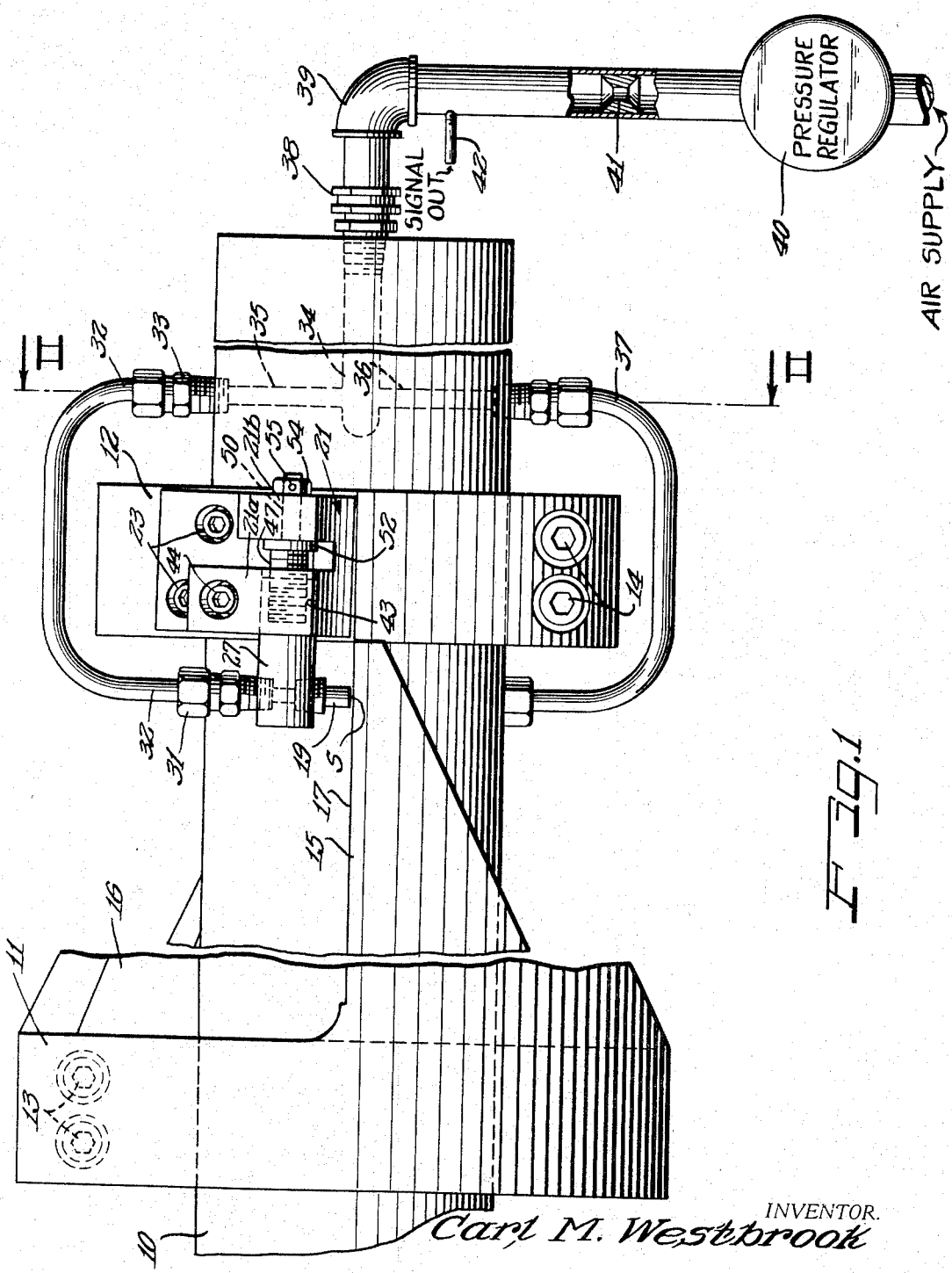

3,342,065
TORQUE METER WITH BALANCING
ARRANGEMENT
Carl M. Westbrook, Beloit, Wis., assignor to Beloit Corporation, Beloit, Wis., a corporation of Wisconsin
Filed Nov. 18, 1964, Ser. No. 412,001
7 Claims. (Cl. 73—136)

The present invention relates to improvements in mechanisms for measuring torque transmitted through a shaft, and more particularly which determine the torque by measuring the twist in a given length of a shaft.

In the operation of heavy machine systems such as paper machines and the like it is particularly important to determine the amount of power applied through a shaft at a given time. For example, in sections of a papermaking machine the power input must be accurately determined and controlled for controlling the operation of different seections of the machine. In such machines it is important that a torque measuring device be connectable to an operating shaft without hampering the normal function of the machine and be capable of continued operation in the presence of water and foreign elements without losing accuracy and effectiveness. It is also important that the mechanism continue operation accurately with the presence of extraneous forces which may bend the shaft, and that the mechanism be readily and quickly adjusted for optimum performance without requiring unnecessary shutdown time of the machine.

It is accordingly an object of the present invention to provide an improved torque measuring device for installation on the shaft of the machine which affords advantages over mechanisms heretofore available and operates using the principles of change in resistance to air flow through a jet with change in twist of the shaft in which torque is being measured.

A further object of the invention is to provide an improved torque measuring device utilizing air flow jets wherein a more simplified structure is provided which can be easily installed and serviced and is capable of long operating life without special attention and frequent repair.

A further object of the invention is to provide a torque measuring device which is capable of greater accuracy and quicker more satisfactory adjustment for optimum performance conditions over a wide range of torque measurements.

Yet another object of the invention is to provide an improved simplified torque measuring device wherein bending forces on the shaft wherein torque is being measured do not have a negative effect and wherein the system can be easily and rapidly adjusted and balanced.

A feature of the invention is the provision of the torque measuring device as set forth above wherein first and second collars are clamped to a shaft at spaced axial locations and the first collar is provided with a pair of circumferentially facing diametrically spaced reaction surfaces and the second collar is provided with diametrically spaced jets directed at the surfaces wherein the jets are supported on the second collar for movement along an axial path non-parallel to the reaction surfaces so that the jets are adjusted axially along their path the spacing between the jets and surfaces is changed, and unique supporting and adjusting mechanism is provided for the jets.

Other objects, advantages and features will become more apparent with the teachings of the principles of the invention in connection with the disclosure of the preferred embodiment thereof in the specification, claims and drawings, in which:

FIGURE 1 is a side elevational view of a portion of a shaft with a torque measuring device constructed and operating in accordance with the principles of the present invention;

FIGURE 2 is a sectional view taken from FIGURE 1 with the left-hand portion of the figure taken along section A—A of FIGURE 1 and the right-hand portion taken along section B—B of FIGURE 1; and FIGURE 3 is a fragmentary detailed exploded view of a portion of the torque measuring device.

On the drawings:

FIGURES 1 and 2 illustrate a shaft 10 through which power is transmitted so that a twist occurs along the shaft, and the twist is a function of torque.

A first split collar 11 is clamped to the shaft 10 at one axial location. Bolts 13 extend through the split collar to draw tightly circumferentially around the shaft and lock it in place so that it will remain at an exact circumferential position and act integrally as a part of the shaft at the location at which it is clamped.

A second collar 12 is clamped to the shaft axially spaced from the first collar 11 and clamping bolts 14 clamp the collar firmly to the shaft so that it will act as an integral part of the shaft at the location at which it is clamped. Relative rotation will thereefore occur between the two clamps as the shaft twists along its length therebetween.

The first collar carries axially extending extension brackets 15 and 16 which project toward the second collar and which have planar axially extending radial reaction surfaces 17 and 18. The reaction surfaces face in the same circumferential direction, as may be viewed in FIGURE 2.

The second collar 12 carries a pair of air jets 19 and 20 which direct a flow of air at the reaction surfaces 17 and 18. The air jets are carried on supported blocks 21 and 22 on the collar 12. The supporting blocks are bolted to planar chordal surfaces 25 and 26 on the collar 12 by bolts such as 23 and 24. The support blocks are positioned at a predetermined angle relative to the axis of the shaft. This angle causes the jets to be positioned so that when they are adjusted axially they will move in a path non-parallel to the reaction surfaces 17 and 18 so that the space between the jet openings and the surfaces will change. By accurately setting the angle of the support blocks 21 and 22, by measuring the amount of axial travel of each of the jets, the change in spacing between the jets and their reaction surfaces can readily be measured. It is essential that the radial distance between the jet and the center line of the shaft be accurate so that accuracy of adjustment of the jets will be facilitated.

The jets are supported on slides or cylinders 27. The cylinders and associated supporting mechanism for each of the jets 19 and 20 is of identical construction so that only one need be described in detail in connection with FIGURE 3.

The jet 19 has a threaded end 28 to screw it into a socket 29 in the support cylinder 27. The support cylinder 27 has a cross passageway, the upper end of which is threaded at 30 to receive an air flow fitting 31. The air flow fitting connects to an air flow tube 32 which leads from a fitting 33 connecting to a branch radial air flow passage 35 leading off an axial supply passage 34. Another radial branch 36, FIGURE 1, leads to a tube 37 which supplies the other jet 20. The tubes 32 and 33 are flexible to permit axial movement of the jets.

For supplying air to the torque measuring mechanism, a rotary fitting 38 connects to the end of the shaft 10 and communicates with the axial drilled passage 34. A supply line 39 connects to the rotary sealed fitting 38 and air flows through a fixed orifice 41 from an AIR SUPPLY having a pressure regulator 40. Air is supplied to the fixed orifice 41 at a pressure on the order of 20 pounds per square inch and suitable air supply pressure is readily available in papermaking mills and most shops in areas where the torque measuring structure will be employed. The output signal for the device is obtained from a branch passage 42 and this signal will of course fluctuate in accordance with the rate of escape of air through the jets 19 and 20 which will affect the drop in pressure through the fixed orifice 41.

The support cylinder 27 moves in a general axial direction in a socket 43, FIGURES 1 and 2. The socket is formed in a portion 21a of the mounting block and the portion 21a is split so that the socket can be lockingly clamped to the cylinder 27 to secure it in place, by means of a bolt 44. For adjustment, the bolt 44 is loosened so that the cylinder 27 can be slid axially. As previously mentioned, the socket 43 is non-parallel to the reaction surface 17 so that as the cylinder 27 is slid axially along its path, the space S between the jet 19 and the surface 17 will change. The same relationship exists between the jet 20 and its reaction surface 18. For sliding the support cylinder 27 axially an adjustment rod 47 has a threaded end 48 received by a threaded opening 49 in the cylinder 27.

The adjustment rod 47 is rotatably mounted and held against axial displacement in a portion 21b of the mounting block. A cylindrical opening 50 extends through the portion 21b, and an annular flange 52 engages one side of the portion 21b, and a nut 54 engages the other side. The nut 54 is locked to the adjustment rod by a pin 55 extending into a radial opening 56 in the rod, FIGURE 3. The opening in the support block 22 for the adjustment rod for the jet 20 is shown at 51.

In operation, the jets 19 and 20 are set so that they have identical spacing relative to their reaction surfaces 17 and 18. In other words, if the spaces S are equal, forces on the shaft which tend to bend it will not adversely effect the operation of the torque measuring device since the output signal 42 measures the effect on both of the jets 19 and 20 and since these jets are diametrically opposed, a bending force which tends to increase the space between one of the jets and its reaction surface will similarly tend to decrease the space between the other jet and its surface. Other advantages are obtained with the use of dual jets. Adjustment is also advantageous to position the jets in their optimum range of operation for the torque which will be encountered. This permits use of the device on shafts which will operate over a wide range of the amount of power transmitted. Also, critical adjustments of the spacing become much more easy to achieve since a substantial movement of the jet will result in only a small change in spacing depending upon the angle between the path of travel of the jet in its axial adjustment, and the reaction surface. The support cylinder 27 can be provided with a scale along its length, which may be graduated in figures indicating jet spacing from the reaction surface so that both jets may be easily and accurately set.

The support cylinders 27 are kept from rotating and the jets are thereby held normal to their reaction surfaces by a pin 46 projecting radially from the cylinder 27 and sliding in a slot 45, FIGURE 2, in the socket 43. The jets 19 and 20 are preferably mounted in their support cylinders so that the air jet emerges normal to the reaction surface.

Thus it will be seen that I have provided an improved mechanism for measuring torque in a shaft, which meet the objectives, advantages and features above set forth. The device embodies a minimum number of operating parts which are susceptible of being reliably and ruggedly constructed for use in high speed machinery and in environments wherein moisture and foreign elements are present. The parts can be readily adjusted to a highly accurate position and positively locked in the adjusted position for continued operation without attention or further adjustment.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A torque meter for measuring torque in a rotatable shaft comprising in combination, a first member adapted to be attached on the shaft having a radial surface facing in a circumferential direction and extending parallel to the shaft axis, a second member adapted to be attached on the shaft axially spaced from the first member, an air jet on the second member directing a stream of air against said surface, a slide support for the jet extending at an acute angle with respect to the shaft axis to vary the spacing between said surface and said jet as a function of the position of the jet along said slide support, and means for adjusting the jet along said slide support, whereby the twist in the shaft between said members can be measured by changing resistance to air emitted from the jet.

2. A torque meter for measuring torque in a rotatable shaft comprising in combination, a first member adapted to be attached on the shaft having a radial surface facing in a circumferential direction and extending parallel to the shaft axis, a second member adapted to be attached on the shaft axailly spaced from the first member, an air jet on the second member directing a stream of air against said surface, a flexible tube connected to the jet, a slide on the second member supporting the jet and extending at an angle to said surface, a pair of relatively rotatable threaded elements with one element connected to the jet and the other to the second member for adjusting the axial position of said jet along said slide, and means for directing air through the tube to said jet whereby the twist in the shaft and the torque transmitted thereby may be measured by the change in resistance to the air being emitted from the jet.

3. A torque meter for meaasuring torque in a rotatable shaft comprising in combination, a first member adapted to be attached on the shaft having a radial surface facing in a circumferential direction and extending parallel to the shaft axis, a second member adapted to be attached on the shaft axially spaced from the first member, an air jet on the second member directing a stream of air against said surface, an elongate support for the jet, a releasable clamp on the second member receiving the support at an angle to said surface so that the position of the jet relative to the surface will change as the support is moved axially in the clamp, and means delivering air to the jet so that the twist in the shaft and the torque transmitted thereby will be manifested by change in resistance to air emitted from the jet.

4. A torque meter for measuring torque in a rotatable shaft comprising in combination, a first member adapted to be attached on the shaft having a radial surface facing in a circumferential direction and extending parallel to the shaft axis, a second member adapted to be attached on the shaft axially spaced from the first member, an air jet on the second member directing a stream of air against said surface, an axially extending cylinder supporting the jet at one end, a cylindrically shaped socket receiving the cylinder and extending generally axially but at an angle to said surface whereby axial movement of the cylinder in said socket will change the spacing between the jet and said surface, means for lockingly clamping the cylinder in said socket, a fitted pin threaded into the cylinder, means for anchoring the axial position of said pin relative to said second member, means for rotating said pin whereby the cylinder will move axially to change the axial and circumferential position of said jet, and means for delivering air to said jet so that the twist in the shaft and torque transmitted thereby will be manifested by the change in resistance to air flow being emitted from the jet.

5. A torque meter for measuring torque in a rotatable shaft comprising in combination, a first split collar with bolts for clampingly locking it to the shaft, a second split collar with bolts for clampingly locking it to the shaft at a position axially spaced from the first collar, projections on the first collar extending toward the second collar having axially extending planar surfaces thereon facing in opposing radial directions and located at diametrically opposed positions relative to the shaft and extending parallel to the shaft axis, a pair of air jets mounted on the second collar and facing said surfaces, means defining air passage branches with an axially extending air passage leading into the shaft with a rotary air supply in connection with the axial passage, flexible tubes connected between the passage branches and the jets, means for measuring pressure drop of air in a line connected to said passage, mounts for each of said jets including supporting elongate cylinders, cylindrical sockets on the second collar receiving said cylinders and extending at acute angles with respect to said surfaces so that as the cylinders move axially in the sockets the spaces between the air jets and said surfaces will vary, said sockets being split and provided with means for tightening the split portion to lock the cylinders in place, pin and axially extending groove means between the sockets and cylinders preventing rotation of the cylinders in the sockets, an adjustment rod for each of the cylinders threadingly engaged with the cylinders and rotatable relative thereto, rotatable supports for the rods holding them in a fixed location relative to the second collar so that rotation of the rods will shift the axial position of the cylinders, and means for turning the rods in rotation whereby the jets are independently individually adjusted for obtaining uniform spacing of each of the jets from the surfaces so that bending of the shaft will not adversely effect an accurate determination of twist of the shaft.

6. A torque meter for measuring torque in a rotatable shaft and in combination with a power driven shaft, a first member on the shaft, means fixedly securing said first member to the shaft, a second member on the shaft spaced axially from said first member, means fixedly securing said second member to the shaft, a radial reaction surface extending axially of said first member toward said second member, a support on said second member, an air jet carried by said support and extending normal to said reaction surface and opening toward said surface, means supplying air to said air jet at a uniform predetermined pressure, mounting means for said support on said second member, said mounting means having an inclined support surface extending at an acute angle with respect to a plane intersecting the center of said shaft and coincident with said reaction surface, means adjustably moving said support along said inclined surface of said mounting means and holding said mounting means in fixed relation with respect to said support, to effect adjustment of the spacing between the end of said air jet and said reaction surface to the spacing required to accurately measure twist in the shaft by changing the resistance to air emitted from said jet.

7. A torque meter according to claim 6, wherein the first member has two diametrically opposed radial reaction surfaces extending axially therefrom toward said second member, wherein said second member has two diametrically opposed supports mounted thereon for adjustable movement therealong at acute angles with respect to a plane intersecting the center of said shaft and extending along said radial reaction surfaces, and wherein each support has an air jet mounted therein extending normal to said reaction surface, and opening directly to said surface, whereby the mounting of said air jets in diametrically opposed relation with respect to each other will simultaneously increase flow through one air jet and decrease flow through the opposite air jet to counteract for errors in torsion measuring due to lateral bending of the shaft.

References Cited

UNITED STATES PATENTS

| | | | |
|---|---|---|---|
| 2,455,285 | 11/1948 | Versaw | 73—88 |
| 3,069,902 | 12/1962 | Crosby | 73—136 |
| 3,079,788 | 3/1963 | Trotin | 73—59 |
| 3,273,387 | 9/1966 | Westbrook et al. | 73—136 |

JAMES J. GILL, *Acting Primary Examiner.*

RICHARD C. QUEISSER, *Examiner.*

C. A. RUEHL, *Assistant Examiner.*